(12) United States Patent
Young

(10) Patent No.: US 8,768,570 B2
(45) Date of Patent: Jul. 1, 2014

(54) WHEEL COVER SYSTEM FOR A 3-WHEELED MOTORCYCLE

(71) Applicant: Steven P Young, Billerica, MA (US)

(72) Inventor: Steven P Young, Billerica, MA (US)

(*) Notice: Subject to any disclaimer, the term of this patent is extended or adjusted under 35 U.S.C. 154(b) by 0 days.

(21) Appl. No.: 13/960,844

(22) Filed: Aug. 7, 2013

(65) Prior Publication Data

US 2013/0320714 A1 Dec. 5, 2013

Related U.S. Application Data

(62) Division of application No. 13/723,702, filed on Dec. 21, 2012, now Pat. No. 8,543,291.

(60) Provisional application No. 61/597,388, filed on Feb. 10, 2012.

(51) Int. Cl.
*G06F 19/00* (2011.01)
*B62K 5/027* (2013.01)
*B60K 17/356* (2006.01)

(52) U.S. Cl.
CPC .............. *B62K 5/027* (2013.01); *B60K 17/356* (2013.01); *B60W 2300/156* (2013.01); *B60W 2510/20* (2013.01); *B60Y 2200/223* (2013.01)
USPC ............. 701/37; 713/300; 713/320; 713/321; 713/323; 375/130; 375/142; 375/146; 375/150; 380/34

(58) Field of Classification Search
CPC ................ B62K 5/027; B60K 17/356; B60W 2300/156; B60W 2510/20; B60Y 2200/223
USPC ................... 701/37; 713/300, 320, 321, 323; 375/130, 142, 146, 150; 327/33, 143, 327/545, 139, 205; 365/189.05, 149, 226; 714/14, 22; 455/522; 380/34
See application file for complete search history.

(56) References Cited

U.S. PATENT DOCUMENTS

| | | | | |
|---|---|---|---|---|
| 4,340,125 A * | 7/1982 | Watanabe et al. | | 180/215 |
| 4,611,679 A * | 9/1986 | Yanagishita et al. | | 180/68.3 |
| 4,630,702 A * | 12/1986 | Irimajiri et al. | | 180/215 |
| 4,703,824 A | 11/1987 | Irimajiri et al. | | |
| 4,955,451 A | 9/1990 | Schaefer | | |
| 5,806,622 A | 9/1998 | Murphy | | |
| 6,161,847 A * | 12/2000 | Howell et al. | | 280/30 |
| 6,276,480 B1 | 8/2001 | Aregger | | |
| 7,207,408 B2 | 4/2007 | Kuroki et al. | | |
| 7,415,770 B2 | 8/2008 | Naruse | | |
| 8,047,594 B1 * | 11/2011 | Matthies | | 296/35.3 |
| 8,256,555 B2 * | 9/2012 | Ackley | | 180/210 |
| 2004/0178011 A1 * | 9/2004 | Lenkman | | 180/210 |
| 2004/0188167 A1 | 9/2004 | Kuroki et al. | | |
| 2007/0075517 A1 | 4/2007 | Suhre et al. | | |
| 2008/0022540 A1 | 1/2008 | Naruse | | |
| 2010/0263167 A1 | 10/2010 | Fox | | |

\* cited by examiner

*Primary Examiner* — McDieunel Marc
(74) *Attorney, Agent, or Firm* — Maine Cernota & Rardin

(57) ABSTRACT

A wheel suspension system for a three-wheeled motorcycle or "trike" includes parallel wheels mounted on vertically pivoting suspension arms governed by hydraulic pistons. The pistons have upper liquid reservoirs that are interconnected through a valve system, which interconnects the upper reservoirs when the trike is in motion, allowing opposing vertical wheel movements when banking through turns, and prevents liquid exchange when the trike is stopped, thereby holding the motorcycle upright, Embodiments include a manual and/or automatic valve control. A threshold switching speed for an automatic controller can be factory set and/or user adjustable. The pistons can include directly interconnected lower fluid reservoirs. A shock-absorbing reservoir can allow transient vertical movement of both wheels to absorb shocks. A cover system can emulate the appearance of saddle bags and can appear to be covering only a single wheel.

8 Claims, 10 Drawing Sheets

WHEEL COVER SYSTEM FOR A 3-WHEELED MOTORCYCLE

RELATED APPLICATIONS

This application is a divisional of application Ser. No. 13/723,702, which was filed on Dec. 21, 2012. Application Ser. No. 13/723,702 claims the benefit of U.S. Provisional Application No. 61/597,388, filed Feb. 10, 2012. Both of these applications are herein incorporated by reference in their entirety for all purposes.

FIELD OF THE INVENTION

The invention relates to motorcycles, and more particularly, to wheel cover systems for 3-wheeled motorcycles.

BACKGROUND OF THE INVENTION

Motorcycle riding is an activity that can be enjoyed by a wide variety of riders having different ages and skill levels. For many, the thrill and excitement of riding a motorcycle is unparalleled by any other activity. And motorcycle riding can be enjoyed by riders who lack the physical fitness and stamina required by many other forms of outdoor recreation.

Nevertheless, motorcycle riding does require some physical ability on the rider's part, especially when the motorcycle is standing still. While a motorcycle may be easy to balance and control while it is in motion, it can be very difficult to manage and even dangerous when stopped or nearly stopped. This can make it very difficult for some riders to operate a motorcycle, especially riders who are senior in age, physically impaired, short in stature, or who simply lack the required physical strength to hold a heavy motorcycle upright while stopping, dismounting, and deploying the kick-stand. As a result, many physically impaired riders, senior riders, women, and others must be content to ride a very light bike, or not to ride at all.

One approach for riders who have difficulty managing a standard motorcycle is to ride a three-wheeled motorcycle, sometimes referred to as a "trike," which has been designed to stand on its own when stopped, thereby eliminating most or all difficulties associated with managing a stopped 2-wheel motorcycle. In some cases, a conventional 2-wheel motorcycle can be converted to a trike, thereby saving cost and providing a wider selection of models available for three-wheel riding.

However, a trike that has been designed to remain upright when standing still presents inherent problems while riding. Specifically, when turning it is desirable for a motorcycle to "bank" into the turn, i.e. to tilt or lean inward so as to counteract the centripetal turning force and maintain the rider's apparent center of gravity above the wheels. Banking during turns improves riding performance and safety, and is also one of the more enjoyable aspects of riding. However, if the two side-by-side parallel wheels of a trike are fixed in height relative to each other, then one of them will tend to lift off of the ground when the trike goes around a curve.

So as to mitigate this problem, some trikes provide a suspension that allows the trike to tilt during a turn without lifting a wheel. One approach is to mount the two parallel wheels on separate lever arms that pivot vertically so as to allow the wheels to separately move up and down when needed. Typically, control rods are connected to the lever arms, whereby the control rods control the vertical movements of the wheels. In some of these designs a "rocker arm" connects the two control rods to each other, thereby requiring that the wheels always move symmetrically in opposite directions. This approach effectively couples the wheel movements to each other, but is generally bulky and difficult to retro-fit to existing 2-wheel motorcycles.

Other lever arm designs use a pneumatic or hydraulic piston mounted on each control rod to manage the vertical movements of the wheels. In some of these designs the hydraulic reservoirs of the pistons are connected to each other, so that an upward movement of one of the wheels forces the other wheel downward. However, these designs do not always cope well when both wheels are lifted off of the ground, for example during servicing, since they can allow both of the parallel wheels to drop down simultaneously to the maximum extensions of the control rods.

In other pneumatic or hydraulic designs the control rods are managed by a processor that uses sensors to determine a speed, handlebar orientation, acceleration, frame orientation, and/or other status parameter of the vehicle, calculates an appropriate tilt angle, and then adjusts the pneumatic or hydraulic system accordingly. However, this approach can be complex, costly, and somewhat unnatural, since the tilt responds to a sensor-based calculation, rather than responding directly to the actual forces encountered by the trike while in operation.

Of course, if the trike is to stand upright on its own, either a conventional "kick-stand" must be provided, or the tilting suspension must provide some mechanism to lock the wheels in place when the trike is not in motion. In some mechanical designs, the suspension is simply locked in place when a manual control is actuated. However, this requires an extra step on the part of the rider. Other designs automatically adjust the suspension to hold the frame "vertical" when certain conditions are sensed, such as a low speed, a straight handlebar orientation, slippage of a wheel, or a sustained frame tilt. However, this approach can require a complex control and sensing system to avoid undesirable results, such as tilting the trike at an unsafe angle when on a hillside.

In addition to the issues described above, riding a "trike" can also carry with it a certain social stigma, so that a rider's enjoyment of riding a trike may be diminished by his or her concern regarding how he or she may be perceived by nearby riders of 2-wheel motorcycles.

What is needed, therefore, is a wheel suspension system for a three-wheeled motorcycle or "trike" that will allow the trike to bank naturally when turning but will hold the frame vertical when the trike is not in motion, is simple in design and yet responds appropriately to hills and roadway depressions, can be retrofitted to existing 2-wheel motorcycles, and can emulate the appearance of a 2-wheel motorcycle, so as to minimize any perceived stigma of riding a trike.

SUMMARY OF THE INVENTION

A suspension system for a three-wheeled motorcycle or "trike" allows the trike to bank naturally when turning, while automatically holding the frame upright when the trike is stationary. The design is simple and compact, and yet it responds appropriately on hills and when crossing roadway depressions. Embodiments can be retrofit to existing 2-wheel motorcycles, and some embodiments provide an appearance that mimics a 2-wheel motorcycle, thereby minimizing any perceived stigma of riding a trike.

According to the invention, the two parallel wheels of the trike are supported by independent, vertically pivoting lever arms, whose vertical movements are governed by corresponding control rods. The lengths of the control rods are determined by hydraulic control pistons, which control the vertical movements of the wheels. Fluid containing regions above the control pistons are filled with a hydraulic fluid and interconnected through a valve system that can be switched between an operating state that allows hydraulic fluid to flow between the two control pistons and a stationary state in which hydraulic fluid flow is blocked. In some embodiments the valve system is electronically controlled, while in other embodiments the valve system is pneumatically controlled using air compressed in a pneumatic reservoir.

In some embodiments, each hydraulic control piston includes hydraulic fluid located below the piston as well as above the piston. In these embodiments, the fluid-containing regions below the control pistons are directly interconnected to each other, so that if both wheels are lifted off of the ground, they will not both drop to the full range of their travel. This can be of benefit e.g. during servicing of the trike.

In some embodiments, a manual control is used to switch the valve system between its two states. In other embodiments, a simple controller and a speed sensor are used to switch the valve system automatically between its two states, according to whether the trike is moving at a speed above or below a threshold speed. Depending on the embodiment, the threshold speed can be factory set and/or set by a rider. In embodiments, the threshold speed is between 1 mph and 15 mph. In some embodiments the controller is microprocessor controlled, while in other embodiments the controller is a simple sensor-driven electrical relay. And in various embodiments both automatic and manual control are provided.

When the valve system is in the operating state, the wheels are partly or totally free to move in symmetrically opposite vertical directions according to the forces encountered during a turn, thereby providing a natural banking experience that is nearly identical to riding a 2-wheel motorcycle. When the valve system is in the stationary state, the vertical positions of the wheels are fixed at whatever positions they held when the speed of the trike fell below the threshold speed. Therefore, the trike is maintained in a vertical orientation even if it is stopped on a hill. Embodiments further include a manual control that can be used to manually switch the valve system between its operational and stationary states, for example to adjust the tilt of the trike when it is stationary.

In embodiments, a shock-absorbing hydraulic fluid reservoir is also in fluid communication with the valve system. The shock-absorbing reservoir allows individual wheels to make transitory, independent vertical movements, for example when passing over rocks or other debris, but pushes the wheels back to their equilibrium positions as soon as the transitory shock has passed. In embodiments, the shock-absorbing reservoir includes a spring-driven piston that regulates the hydraulic pressure of the hydraulic fluid above the two control pistons.

In some embodiments where the parallel wheels are the rear wheels, a cover is included that covers the two parallel rear wheels and provides an outward appearance of a storage compartment or "saddle bags" of a style that is typically seen on 2-wheel motorcycles, thereby visibly obscuring the fact that the vehicle has three wheels.

One general aspect of the present invention is a suspension system for controlling vertical movements of two side-by-side parallel wheels of a three-wheeled motor vehicle. The suspension system includes a pair of suspension arms, each suspension arm having a proximal end pivotally attached to a frame of the vehicle, so that the suspension arm can pivot vertically about its proximal end, and each suspension arm having a distal end to which one of the parallel wheels is rotatably attached. The suspension system further includes a pair of variable length control rod assemblies, each control rod assembly having a proximal end attached to the frame of the vehicle and a distal end attached to a corresponding suspension arm, so that pivoting of the suspension arm requires changes in length of the control arm assembly, a pair of hydraulic piston mechanisms cooperative with the control arm assemblies, so that changing a control arm assembly's length requires moving a piston within the corresponding piston mechanism, each hydraulic piston mechanism having an upper liquid reservoir above its piston, a valve system in liquid communication with the upper liquid reservoirs of the piston mechanisms, the valve system having an operating state in which hydraulic fluid is allowed to flow between the upper reservoirs, the valve system having a stationary state that prevents changes to the amounts of hydraulic fluid in the upper reservoirs, and a controller in controlling communication with the valve system, the controller being able to transition the valve system between the operating state and the stationary state.

In some embodiments the controller is manually operated.

In certain embodiments the controller is able to automatically transition the valve system to the operating state when the vehicle is traveling at a speed above a threshold speed, and automatically transition the valve system to the stationary state when the vehicle is traveling below the threshold speed. In some of these embodiments the threshold speed is between one mile per hour and fifteen miles per hour. In other of these embodiments the threshold speed is pre-set. In still other of these embodiments the threshold speed can be adjusted by an operator. And yet other of these embodiments further include a manual control configured to allow manual switching of the valve system between the operating state and the stationary state.

Embodiments further include a lower liquid reservoir below each piston, the two lower reservoirs being in direct liquid communication with each other, so that hydraulic fluid leaving one lower reservoir is forced to enter the other lower reservoir.

In various embodiments the suspension system can be retro-fit to an existing two-wheel motorcycle. In some of these embodiments the suspension system can be pre-assembled before attachment to the existing two-wheel motorcycle. And in some of these embodiments the pre-assembled suspension system can be attached in place of a rear motorcycle wheel to a frame of the existing two-wheel motorcycle by one or more attachment brackets.

In certain embodiments the controller includes a microprocessor.

Some embodiments further include a hydraulic shock absorber in liquid communication with the valve system, the hydraulic shock absorber being configured when the valve system is in the operating state to exchange hydraulic fluid with the connected upper reservoirs, whereby a liquid pressure of the upper reservoirs is increased when hydraulic fluid flows from the upper reservoirs into the hydraulic shock absorber, and decreased when hydraulic fluid flows from the hydraulic shock absorbers into the upper reservoirs. And in some of these embodiments the hydraulic shock absorber includes a piston located between a shock absorber liquid reservoir and a spring, so that an increase of liquid in the shock absorber liquid reservoir moves the piston and compresses the spring.

Various embodiments further include a wheel cover system that is configured to partially cover the two parallel wheels and to create a visual impression that the cover is covering a single wheel instead of covering two parallel wheels. In some of these embodiments the wheel cover system presents an appearance of a saddlebag storage system. Other of these embodiments further include a central feature that emulates an appearance of a wheel guard that would cover a single rear wheel of a 2-wheel motorcycle.

Another general aspect of the present invention is a wheel cover system for a three-wheeled motor vehicle. The wheel cover system includes a cover system configured to partially cover a pair of side-by-side parallel wheels of the three-wheeled motor vehicle, and to create a visual impression that the cover is covering a single wheel instead of covering two parallel wheels.

In some embodiments the wheel cover system presents an appearance of a saddlebag storage system.

Other embodiments further include a central feature that emulates an appearance of a wheel guard that would cover a single rear wheel of a 2-wheel motorcycle. And in some of these embodiments the central feature is a wheel cover retained from a two-wheel motorcycle after its conversion to a three-wheeled motor vehicle.

In certain embodiments the side-by-side parallel wheels are rear wheels of the motor vehicle.

Yet another general aspect of the present invention is a three-wheeled motor vehicle, which includes a pair of side-by-side parallel wheels; and a wheel cover system configured to partially cover the pair of side-by-side parallel wheels, and to create a visual impression that the cover is covering a single wheel instead of covering two parallel wheels.

In embodiments, the wheel cover system presents an appearance of a saddlebag storage system.

Some embodiments further include a central feature that emulates an appearance of a wheel guard that would cover a single wheel of a 2-wheel motorcycle. And in some of these embodiments the central feature is a wheel cover retained from a two-wheel motorcycle after its conversion to a three-wheeled motor vehicle.

And in various embodiment the side-by-side parallel wheels are rear wheels of the motor vehicle.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A suspension system for a three-wheeled motorcycle or "trike" allows the trike to bank naturally when turning, while holding the frame upright when the trike is stationary. The design is simple and compact, and yet it responds appropriately on hills and when crossing roadway depressions. Embodiments can be retrofitted to existing 2-wheel motorcycles, and some embodiments provide an appearance that mimics a 2-wheel motorcycle, thereby minimizing any perceived stigma of riding a trike.

Figure 1:
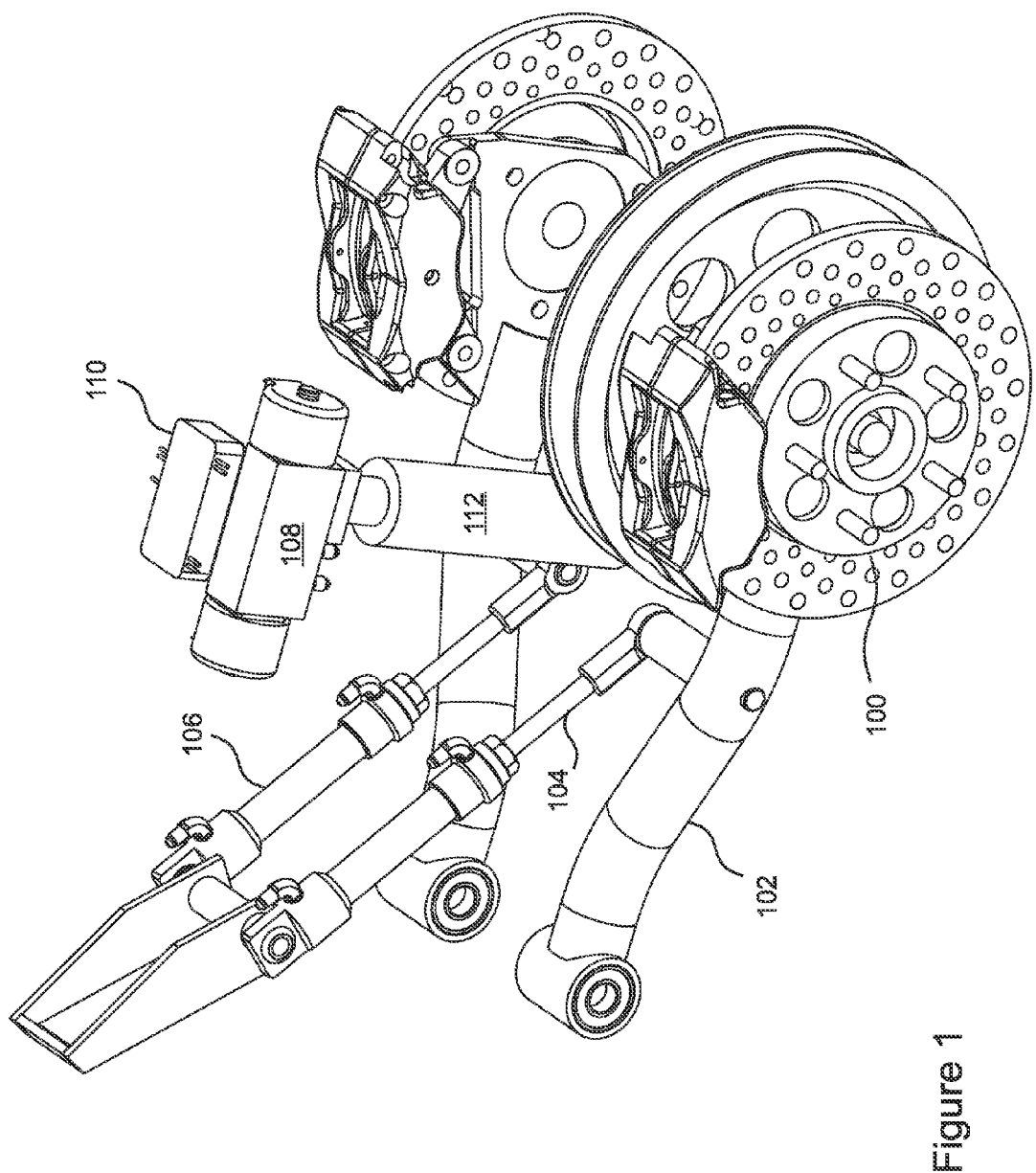
FIG. 1 is a perspective view of an embodiment shown without tires or wheels.

With reference to FIG. 1, the two parallel wheel hubs 100 of the trike (shown in the figure without tires) are supported by independent, vertically pivoting lever arms 102, whose vertical movements are governed by corresponding control rods 104. The lengths of the control rods 104 are determined by hydraulic control pistons 106, which thereby control the vertical movements of the wheels 100.

Figure 2:
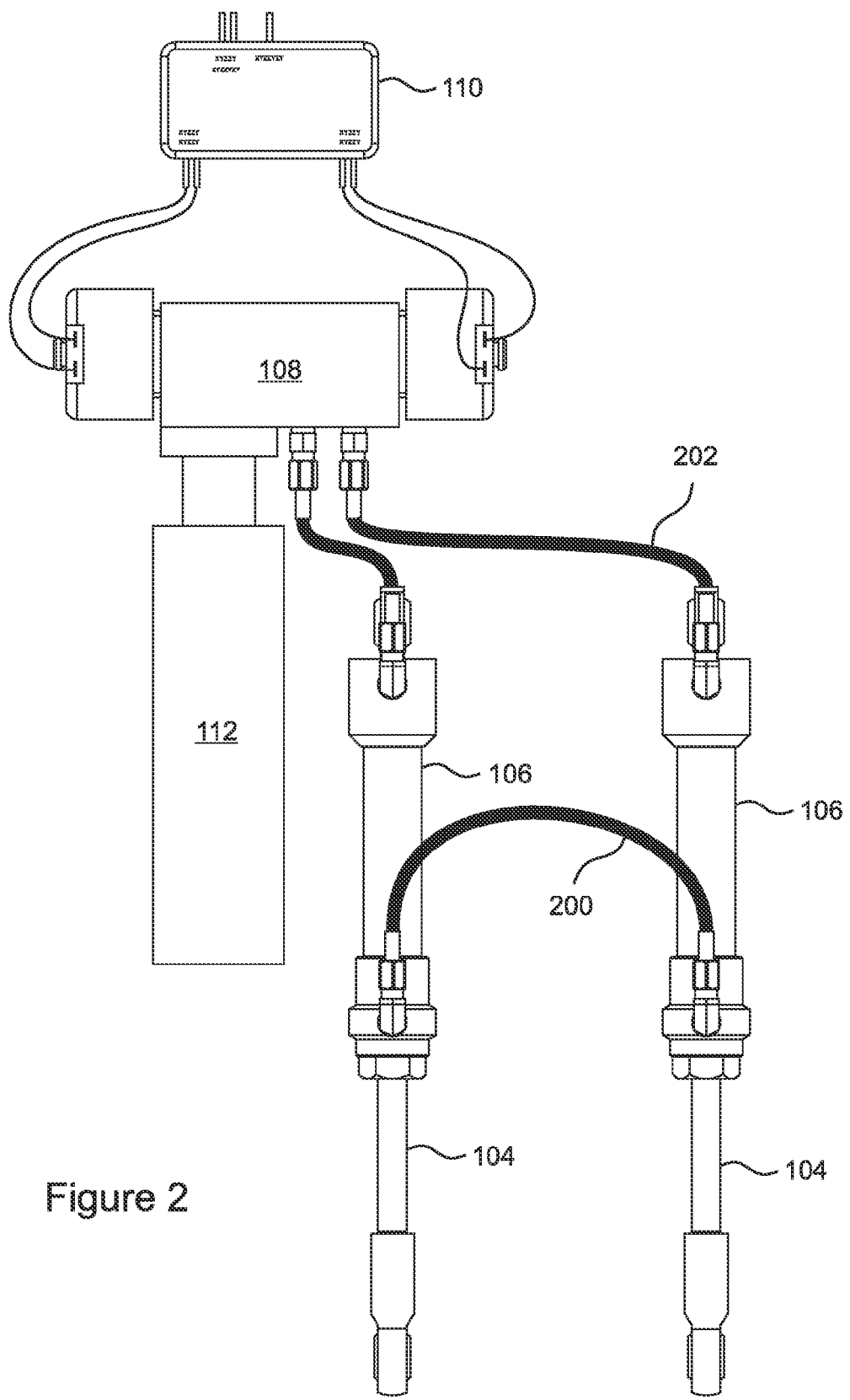
FIG. 2 is an illustration of the functional components of an embodiment of the invention.

With reference to FIG. 2, each hydraulic control piston 106 includes hydraulic fluid located above the piston. The fluid containing regions above the control pistons are interconnected 202 through a valve system 108 that can be switched between an operating state that allows hydraulic fluid to flow between the two control pistons 106 and a stationary state where hydraulic fluid flow is blocked.

In some embodiments, hydraulic fluid is also located below the pistons, and the fluid-containing regions below each control piston are directly interconnected 200, so that if both wheels are lifted off of the ground, for example during servicing, they cannot drop down to the full extensions of the control rods.

Figure 3:
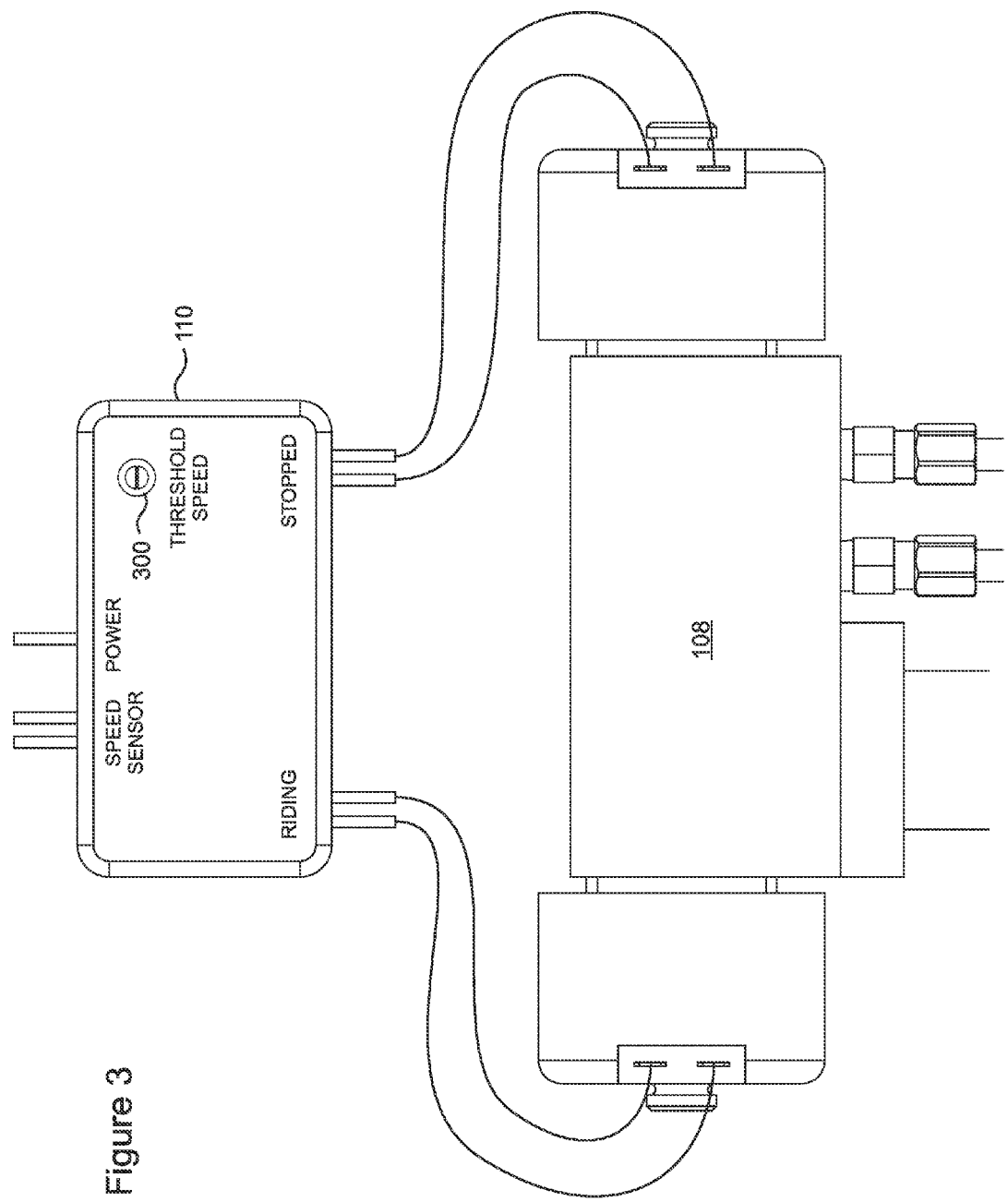
FIG. 3 is an enlarged illustration of the valve system and controller of the embodiment of FIG. 2.

With reference to FIG. 3, in some embodiments a simple controller 110 and a speed sensor (not shown) are used to switch the valve system 108 between its two states according to whether the trike is moving at a speed above or below a threshold speed that can be factory set and/or set by a rider. In embodiments, the threshold speed is between 1 mph and 15 mph. In the embodiment of FIG. 3, the threshold is adjusted by a simple mechanical adjustment 300. In some embodiments the controller 108 is microprocessor controlled, while in other embodiments the controller 108 is a simple sensor-driven electrical relay. In still other embodiments, the controller 108 is actuated by a mechanical switch.

Figure 4A:
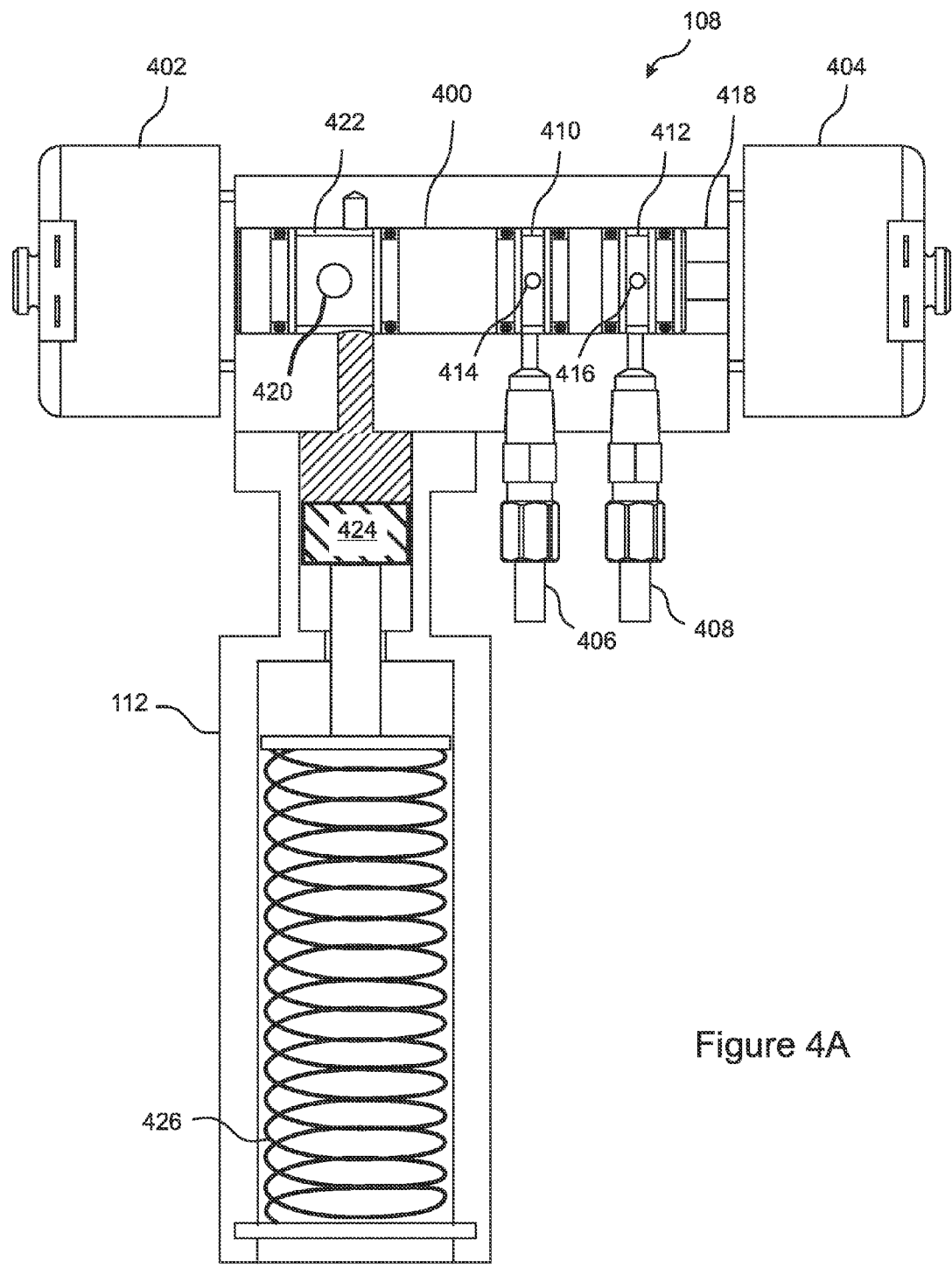
FIG. 4A is a cross-sectional illustration of the valve system and reservoir of the embodiment of FIG. 2, with the valve system shown in the operating state.
Figure 4B:
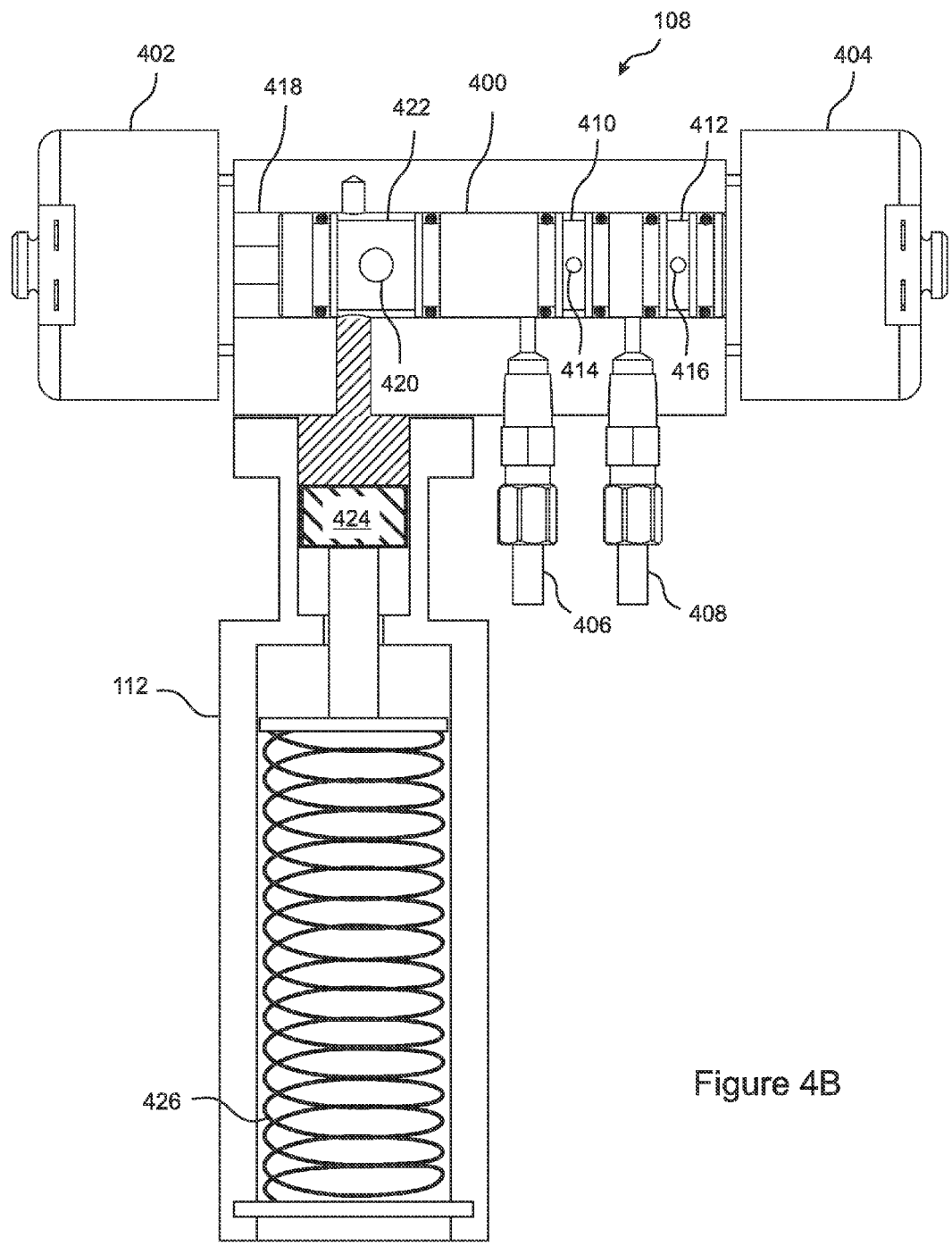
FIG. 4B is a cross-sectional illustration of the embodiment of FIG. 4A, with the valve system shown in the stationary state.

FIGS. 4A and 4B present cross-sectional illustrations of a valve system 108 in an embodiment of the invention. The valve system 108 includes a central sliding element 400 driven between two lateral positions by a pair of solenoids 402, 404 that are driven by the controller 110. FIG. 4A illustrates the central sliding element 400 in the operating state, wherein fluid inlets 406, 408 from the two control pistons 106 are connected to internal chambers 410, 412 formed between O-ring seals of the central sliding element 400 and the surrounding tubular wall 418. From the internal chambers 410, 412, the hydraulic fluid is able to flow through holes 414, 416 in the central sliding element 400 and into a central tube, thereby providing fluid communication between the two fluid inlets 406, 408.

FIG. 4A also includes a cross-sectional illustration of a shock-absorbing reservoir 112 that is also in fluid communication with the valve system 108. The reservoir 112 is connected to a reservoir chamber 420 within the valve system 108, and from there to the interior tube that also communicates with the two fluid inlets 406, 408 and with the control pistons 106. When the valve system 108 is in the operating state, if one of the wheels hits a rock or other irregularity in the road surface, it can unilaterally make a vertical excursion by driving additional hydraulic fluid into the shock absorbing reservoir 112. This will drive a reservoir piston 424 downward against a reservoir spring 426 and temporarily increase the pressure of the hydraulic fluid in the valve system 108. Once the irregularity has passed, the spring 426 will push the reservoir piston 424 back up, and the wheels 100 will return to their normal relationship relative to each other.

FIG. 4B presents a cross-sectional illustration of the valve system 108 of FIG. 4A with the central sliding element 400 in the stationary state. The inlets 406, 408 are no longer connected to the internal chambers 410, 412, and so there is no fluid communication between them, nor between the inlets 406, 408 and the reservoir 112.

It will be clear to one skilled in the art that when the valve system 106 is in the operating state, the wheels 100 are partly or totally free to move in symmetrically opposite vertical directions according to the forces encountered during a turn, thereby providing a natural banking experience that is nearly identical to riding a 2-wheel motorcycle. When the valve system is in the stationary state, the positions of the wheels are fixed at whatever positions they held when the speed of the trike fell below the threshold speed. Therefore, the trike is maintained in a vertical orientation even if it is stopped on a hill. Embodiments further include a manual control (not shown) that can be used to manually switch the valve system 108 between its operational and stationary states, for example to adjust the tilt of the trike when it is stationary.

Figure 5:
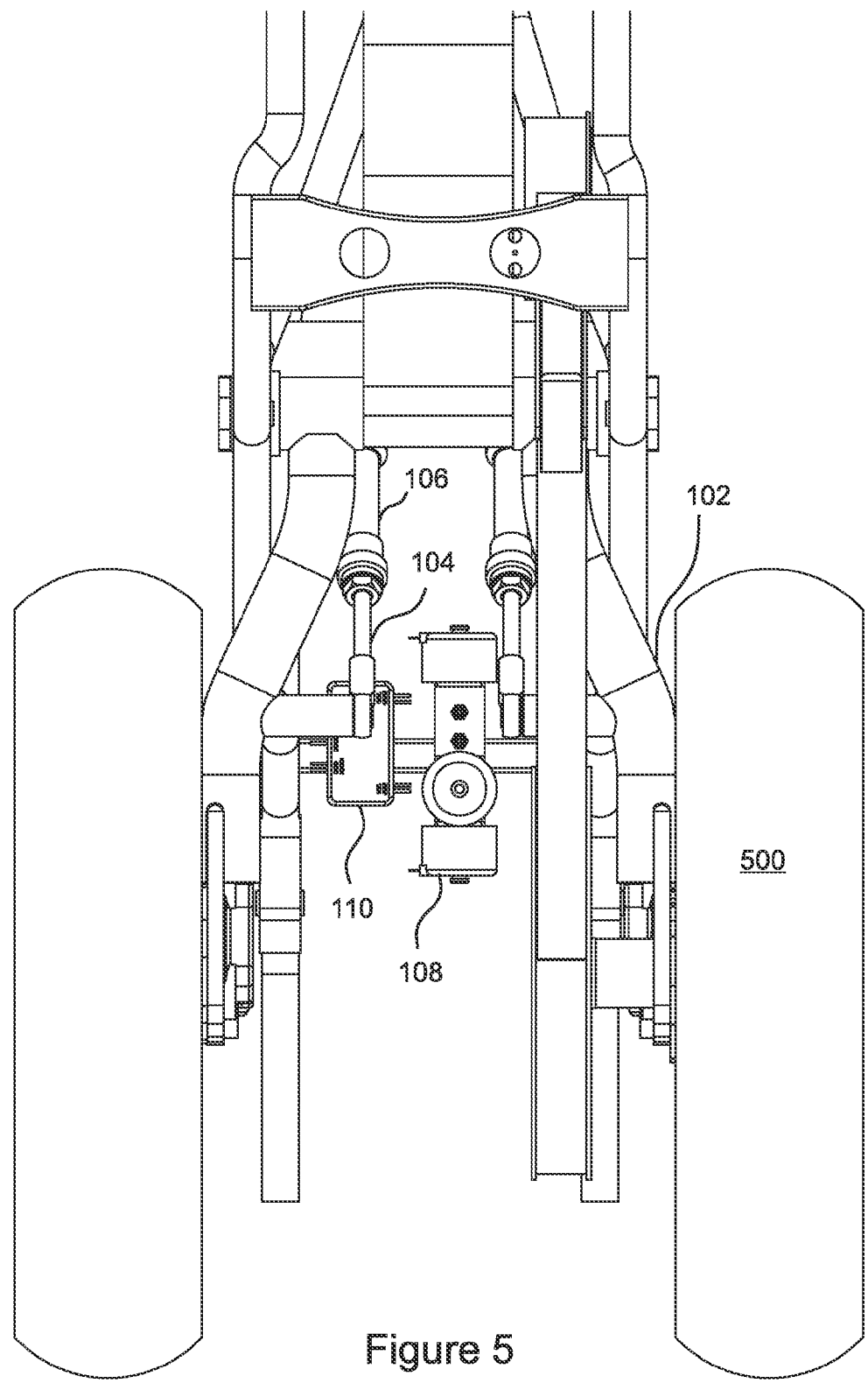
FIG. 5 is a view from below of an embodiment of the invention.
Figure 6:
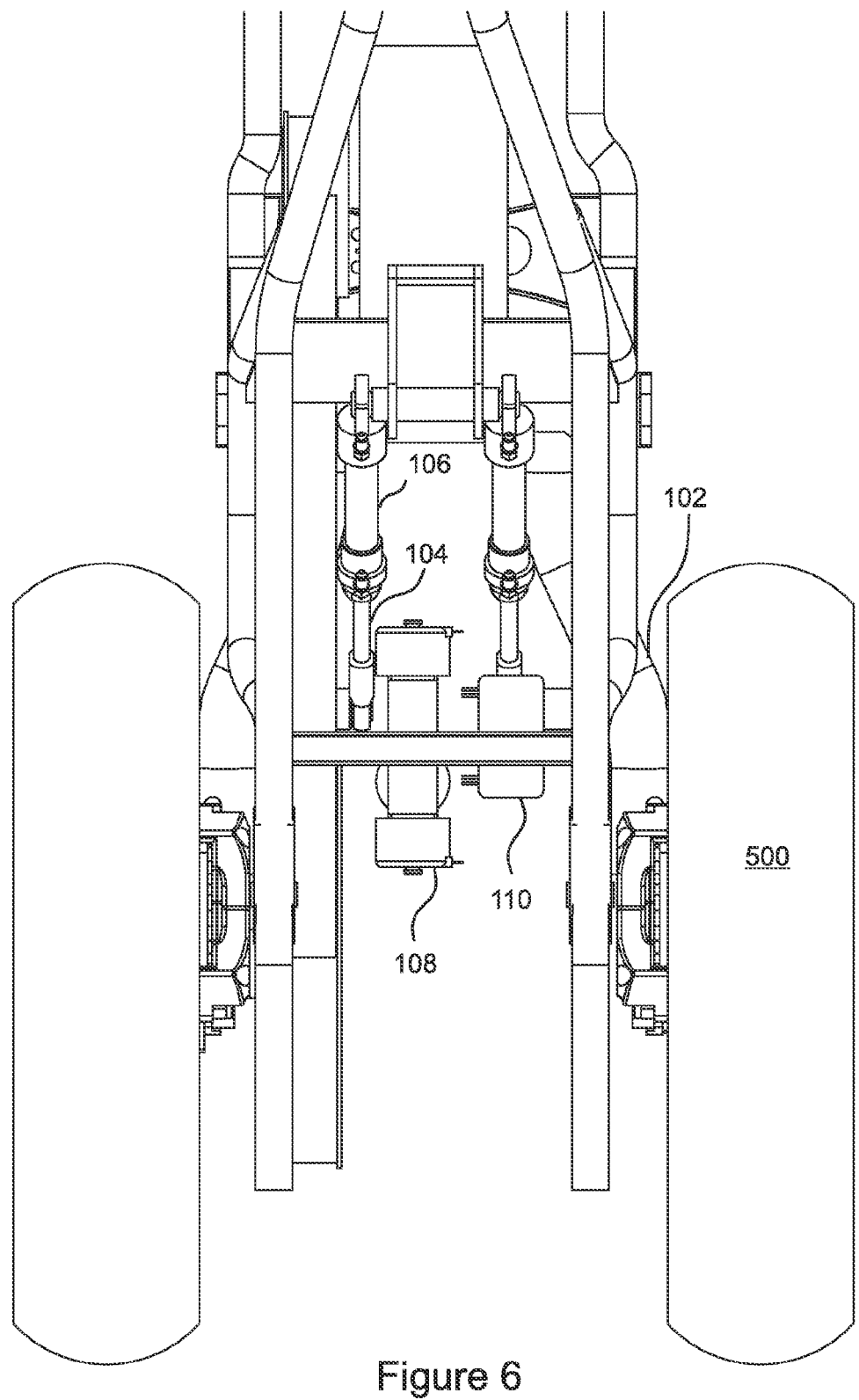
FIG. 6 is a view from above of the embodiment of FIG. 5.
Figure 7:
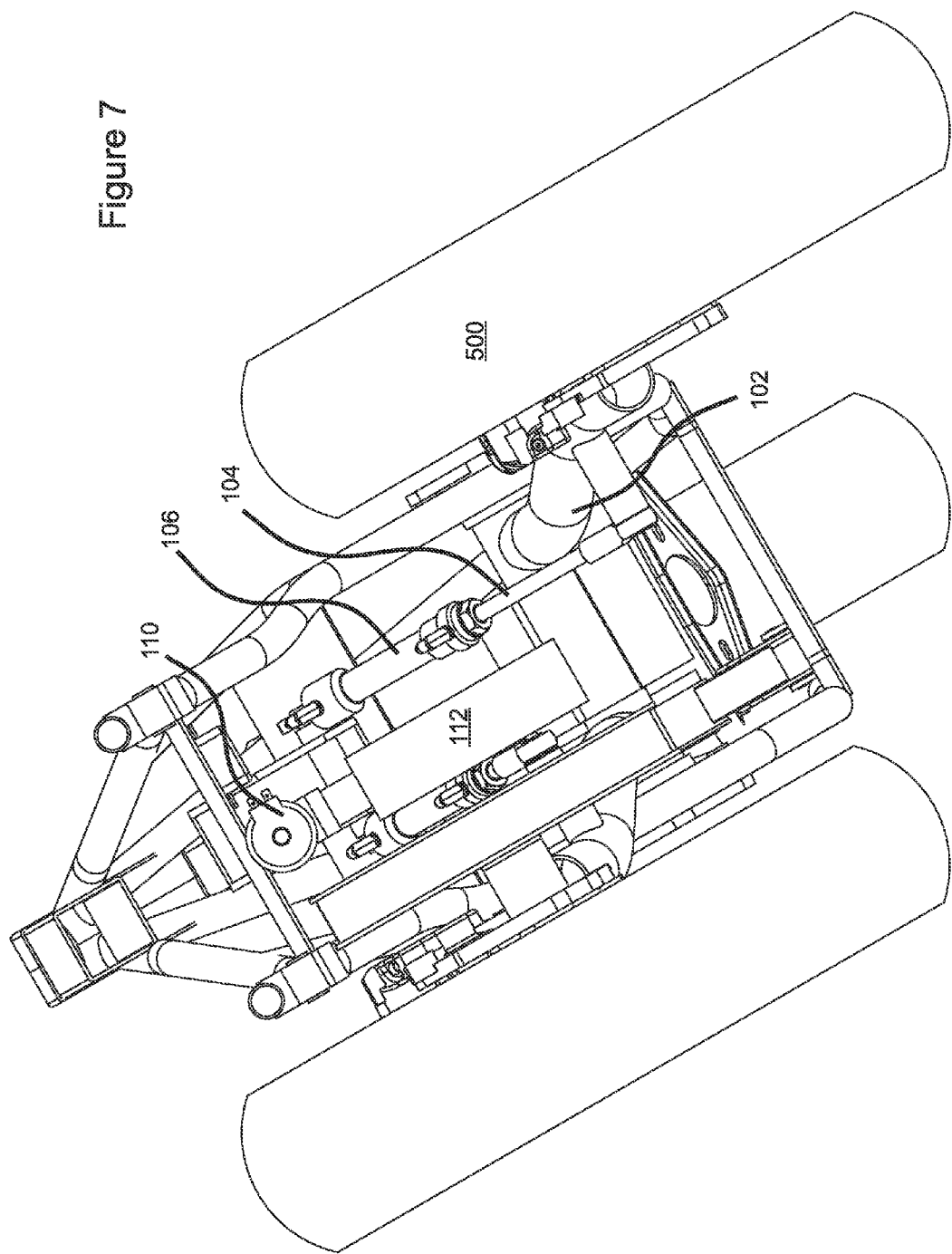
FIG. 7 is a view from behind of the embodiment of FIGS. 5 and 6, shown when the trike is tilted during a turn.

FIG. 5 is a view from below of an embodiment of the invention. FIG. 6 is a view from above of the embodiment of FIG. 5, and FIG. 7 is a rear view of the embodiment of FIGS. 5 and 6 shown when the trike is tilted during a turn. In these figures the wheels and tires 500 are mounted on the wheel hubs 100.

Figure 8:
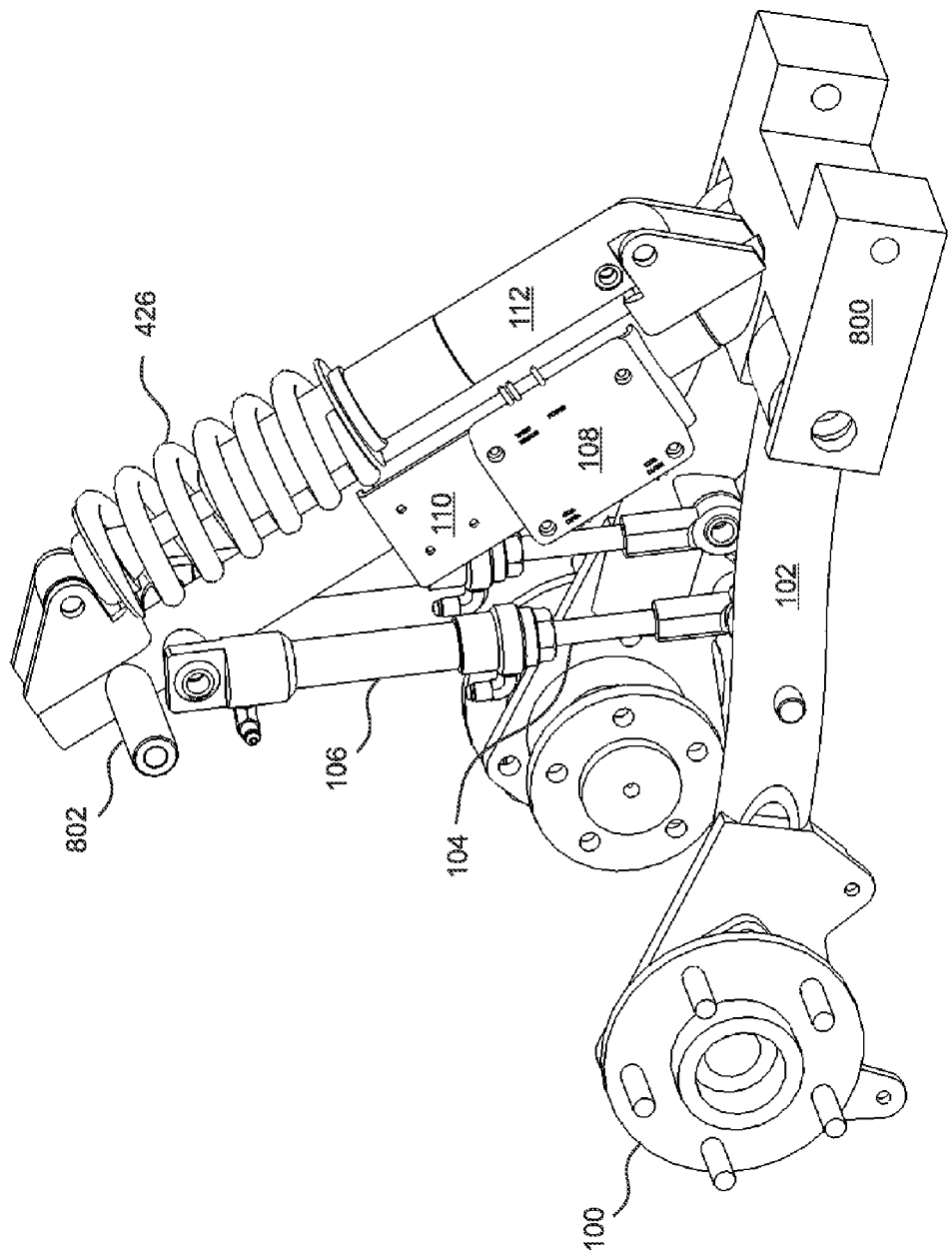
FIG. 8 is a perspective view of an alternate embodiment of the present invention shown without wheels.

FIG. 8 is a perspective view of an alternate embodiment of the present invention, in which the control rods 104 and pistons 106 are oriented vertically, while the shock-absorbing piston 112 and spring 426 are oriented at an angle. This is in contrast with the embodiment of FIG. 1, where the control rods 104 and pistons 106 are slanted, and the shock-absorbing piston 112 and spring are vertical. This embodiment has advantages for retrofitting an existing 2-wheel motorcycle, since the assembly as shown can be constructed in advance, and then attached to the motorcycle by one or more attachment brackets 800, 802.

Figure 9:
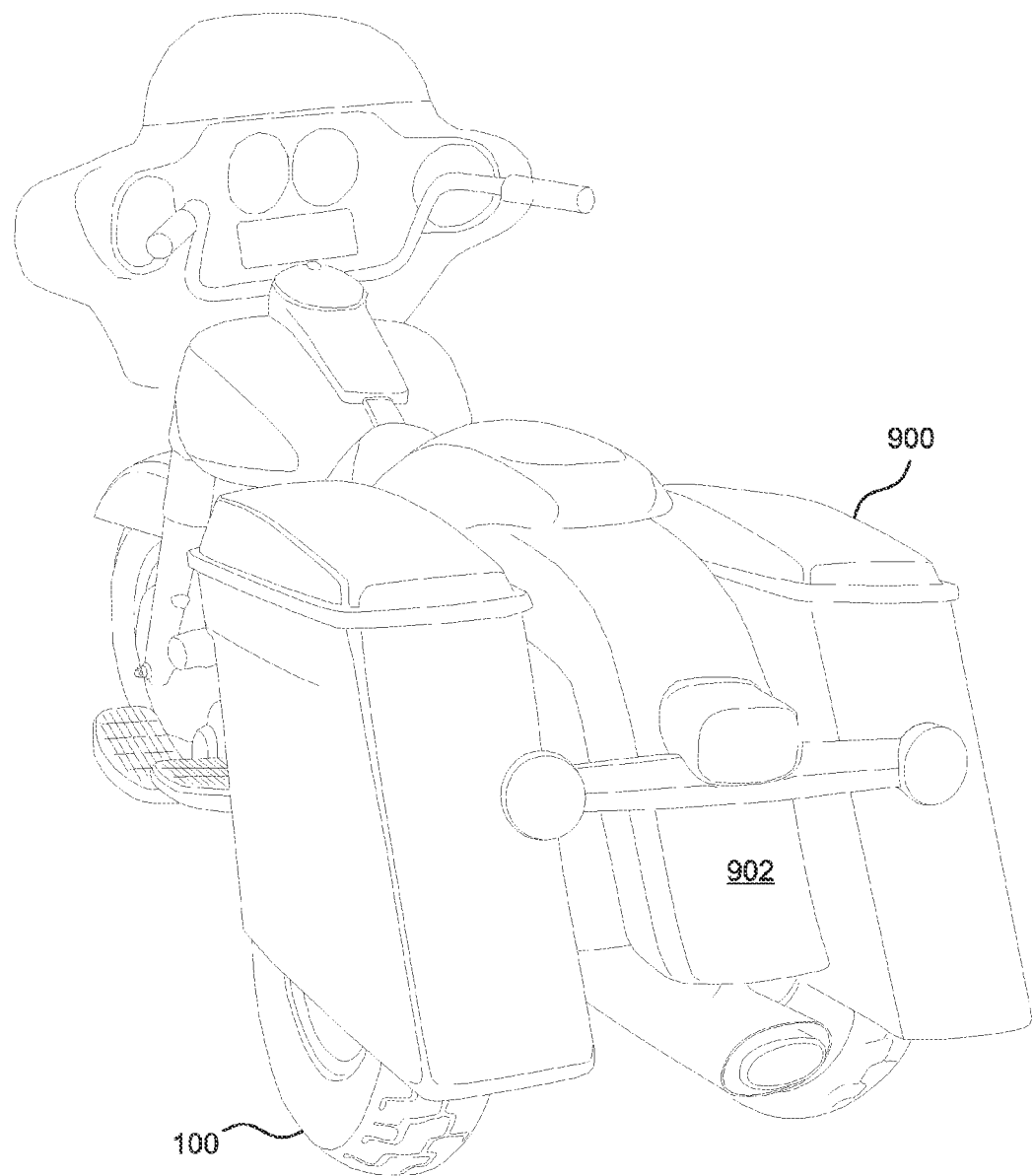
FIG. 9 is a perspective view from behind of an embodiment that includes a cover which gives an outward appearance of a motorcycle saddlebag, thereby causing the trike to emulate the appearance of a conventional 2-wheel motorcycle.

With reference to FIG. 9, in some embodiments where the parallel wheels 100 are the rear wheels, a cover 900 is included that covers the two parallel rear wheels 100 and provides an outward appearance of a storage compartment or "saddle bags" of a style that is typically seen on 2-wheel motorcycles, thereby visibly obscuring the fact that the vehicle has three wheels. In some of these embodiments, a central feature 902 is provided that emulates the appearance of a wheel guard that would cover a single rear wheel of a 2-wheel motorcycle. In embodiments, the rear feature 902 is a rear wheel cover retained from a two-wheel motorcycle that has been converted to the three-wheel suspension of the present invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A wheel cover system for a three-wheeled motor vehicle, the wheel cover system comprising a cover system configured to cover more than 50% of the outward-facing sides of a pair of side-by-side parallel rear wheels of the three-wheeled motor vehicle, and to create a visual impression when viewed from the rear that the cover is covering a single wheel flanked by two saddlebag storage units instead of covering two parallel wheels.

2. The wheel cover system of claim 1, further comprising a central feature that emulates an appearance of a wheel guard that would cover a single wheel of a 2-wheel motorcycle.

3. The wheel cover system of claim 2, wherein the central feature is a wheel cover retained from a two-wheel motorcycle after its conversion to a three-wheeled motor vehicle.

4. A three-wheeled motor vehicle, comprising:
a pair of side-by-side parallel wheels; and
a wheel cover system configured to cover more than 50% of the outward-facing sides of the pair of side-by-side parallel wheels, and to create a visual impression when viewed from the rear that the cover is covering a single wheel instead of covering two parallel wheels.

5. The three-wheeled motor vehicle of claim 4, wherein the wheel cover system presents an appearance of a saddlebag storage system.

6. The three-wheeled motor vehicle of claim 4, further comprising a central feature that emulates an appearance of a wheel guard that would cover a single wheel of a 2-wheel motorcycle.

7. The three-wheeled motor vehicle of claim 6, wherein the central feature is a wheel cover retained from a two-wheel motorcycle after its conversion to a three-wheeled motor vehicle.

8. The three-wheeled motor vehicle of claim 4, wherein the side-by-side parallel wheels are rear wheels of the motor vehicle.

* * * * *